United States Patent

Friedrichsen et al.

[11] Patent Number: 6,095,922
[45] Date of Patent: Aug. 1, 2000

[54] ROTATION DAMPER

[75] Inventors: Bernd Friedrichsen, Norderstedt; Klaus Schmidt, Eibelstadt, both of Germany

[73] Assignee: ITW-ATECO GmbH, Norderstedt, Germany

[21] Appl. No.: 08/925,585

[22] Filed: Sep. 8, 1997

[30] Foreign Application Priority Data

Sep. 7, 1996 [DE] Germany .......................... 196 36 475

[51] Int. Cl.$^7$ .................................................. F16D 3/80
[52] U.S. Cl. ............................ 464/24; 74/574; 188/378
[58] Field of Search ................... 464/7, 10, 24, 464/180, 185; 74/574; 267/140; 188/378, 379

[56] References Cited

U.S. PATENT DOCUMENTS

| | | | |
|---|---|---|---|
| T973,005 | 8/1978 | Shyu et al. | 74/574 |
| 2,729,518 | 1/1956 | O'Connor. | |
| 2,787,894 | 4/1957 | Hamann | 464/7 |
| 2,819,775 | 1/1958 | Everett | 188/379 |
| 3,105,370 | 10/1963 | Weasler | 464/7 |
| 3,296,888 | 1/1967 | Schweitzer | 74/574 |
| 3,425,239 | 2/1969 | Baier | 74/574 |
| 3,904,011 | 9/1975 | Theyse et al. | 74/574 |
| 3,986,411 | 10/1976 | Kirby | 74/574 |
| 3,992,963 | 11/1976 | Khanna | 74/574 |
| 4,385,665 | 5/1983 | Knoll | 188/379 X |
| 4,432,254 | 2/1984 | Schultz | 188/379 X |
| 4,640,216 | 2/1987 | Lehmann et al. | 188/379 |
| 4,736,510 | 4/1988 | Jorg et al. | 74/574 |
| 4,781,077 | 11/1988 | El-Sahfei. | |
| 4,787,868 | 11/1988 | Hoshiba et al. | 464/180 |
| 4,825,718 | 5/1989 | Seifert et al. | 464/180 |
| 4,873,888 | 10/1989 | Matsuyama | 74/574 |
| 4,905,776 | 3/1990 | Beynet et al. | 74/574 |
| 5,095,786 | 3/1992 | Bellinghausen et al. | 74/574 |
| 5,368,275 | 11/1994 | Ketcham et al. | 285/319 |
| 5,413,318 | 5/1995 | Andreassen | 267/140 |
| 5,425,675 | 6/1995 | Pfeifer | 464/180 |

FOREIGN PATENT DOCUMENTS

| | | | |
|---|---|---|---|
| 2 377 548 | 8/1978 | France . | |
| 2531512 | 2/1984 | France | 464/7 |
| 951 965 | 10/1956 | Germany . | |
| 1 196 020 | 7/1965 | Germany . | |
| 1 675 696 | 8/1970 | Germany . | |
| 24 57 042 | 4/1982 | Germany . | |
| 31 23 344 | 12/1982 | Germany . | |
| 296 04 260 | 6/1996 | Germany . | |
| 137624 | 8/1983 | Japan | 464/7 |
| 17027 | 1/1984 | Japan | 464/7 |
| 62-101933 | 5/1987 | Japan . | |
| 41708 | 5/1962 | Luxembourg . | |
| 895460 | 5/1962 | United Kingdom | 188/378 |
| 2 095 789 | 10/1982 | United Kingdom . | |
| 88/09885 | 12/1988 | WIPO . | |

*Primary Examiner*—Terry Lee Melius
*Assistant Examiner*—Greg Binda
*Attorney, Agent, or Firm*—Schwartz & Weinrieb

[57] ABSTRACT

A rotation damper with a housing, a rotor which is rotatably mounted in the housing and which, with the housing, forms at least one gap into which a viscous medium is enclosed, and an axle or shaft which is connected to the rotor and which at least at one end projects out from the housing. There is further provided a filler opening, for the viscous medium, which is formed in the housing and which at least over part of its length comprises a uniform circular cross section and a closure element comprising a circular linear sealing edge, the diameter of which is somewhat larger than the inner diameter of the filler opening in the region of the uniform cross section.

14 Claims, 1 Drawing Sheet

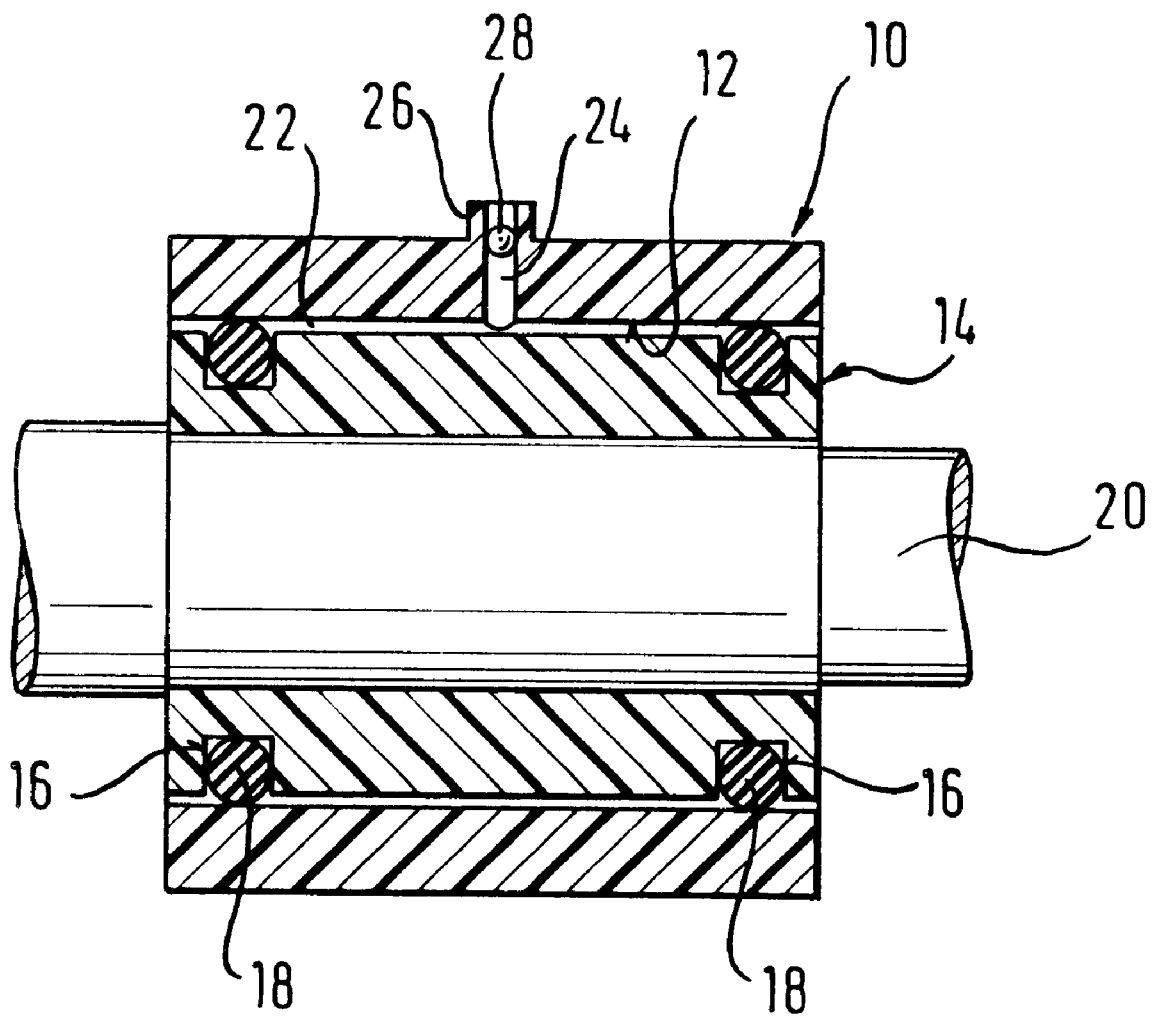

ROTATION DAMPER

FIELD OF THE INVENTION

The present invention relates generally to a rotation damper and more particularly to a rotation damper having unique and novel means for facilitating the filling of the same with a viscous medium.

BACKGROUND OF THE INVENTION

Rotation dampers with which a viscous medium is arranged in an annular gap between the rotor and the housing are known in accordance with various embodiments. In the simplest case, the rotor is formed by a cylinder which is rotatably arranged in a cylindrical space. The viscous medium is located in an annular gap between the parts. It has also become known to design the rotor as a blade-like structure and to provide a gap between the ends of the blades and the cylindrical space in the housing. Usually the rotor is connected to an axle and a shaft which at one end is led out of the housing and is in working connection with a part to be dampened by means of a gearing. Such rotation dampers are for example employed in motor vehicles in order to brake the opening of the glove box cover, ash tray lid or the like. It is further known to provide such rotation dampers with a free-wheel in which the rotation of the rotor in one direction is effected essentially undampened. Finally, it has also become known to let such rotation dampers act directly upon the rotational axle of a pivotably mounted part. By means of this structure, the rotation brake may be integrated into the mounting of the pivotably mounted part thus not increasing the constructional dimensions of the part to be dampened. The latter rotation damper is known from DE 296 04 260.

Generally there is the requirement to construct such rotational dampers very small. On the other hand a certain braking moment must be able to be produced. There have thus been numerous suggestions which would permit the braking moment to become as large as possible, in that for example the shear surfaces engaged with the viscous medium are designed as large as possible. This for example may be effected in that several sleeve type sections of the rotor and housing mesh in an interlaced manner.

A problem develop, however, in connection with the filling of the viscous medium. With most rotation dampers the viscous medium is filled during the assembly of the damper. An end face closure plate in most cases forms the end closure. Such a manner of filling the dampers with the viscous medium is not practiced in connection with rotation dampers which must be assembled before filling, for example with those dampers with which the axle or the shaft are led out of the housing on both sides. With these dampers it is conceivable to provide an annular closure on the end face. However, due to the small width of the annular gap and also due to other reasons of design this is difficult to realize. Furthermore, the viscous medium must be deposited within the damper in accordance with a very precise metering procedures since otherwise the viscous medium is squeezed out or too much air remains in the inside of the housing. Both situations are seen to be disadvantageous since either they lead to contamination or the desired torque is not achieved due to the inclusion of air.

OBJECT OF THE INVENTION

It is therefore the object of the invention to provide a rotation damper which is formed such that the viscous medium may be simply filled and kept sealed, also with a finished assembled damper.

SUMMARY OF THE INVENTION

According to the invention, in the housing there is provided for the viscous medium, a filler opening which at least over part of its length comprises a uniform circular cross section. Further, there is provided a closure element which comprises a circular linear sealing edge, the diameter of which is somewhat larger than the inner diameter of the filler opening in the region of the uniform cross section. After filling with the viscous medium, the closure element is inserted into the opening. The closure element may be completely or approximately brought into contact with the medium, wherein air which is still present may escape past the sealing edge. The sealing edge however burrows itself into the wall of the filler opening after some time and thus secures the closure element against being pressed out or from falling out.

The closure element may be shaped in any way as long as it comprises the circular sealing edge. According to one embodiment of the invention, a ball preferably of steel is preferred as the closure element, since the ball may be applied in any position and always forms a circular sealing line, which with other formed bodies, is only the case with a certain orientation.

The invention is particularly advantageous when applied to rotation dampers with which the shaft or the axle at both ends of the housing lie free or project out of the housing. As has already been mentioned, such rotation dampers must be assembled before the viscous medium is filled.

The length of the filler opening may not be too small. It must be at least twice as long as the diameter of the sealing edge, for example it should correspond at least to double the diameter of a ball. Preferably the length of the filler opening is even somewhat larger so that tolerances are able to be compensated for when filling with the viscous medium.

Since the closure element has no defined position seen in the axial direction of the filler opening, not only can it compensate for tolerances in the filling quantity, but may also exert a desired pressure on the viscous medium. The viscous medium itself is not compressible, but by means of the components employed with the rotation damper such as, for example, the rotor, housing and seals, the pressure of the medium may be varied within limits.

It has been ascertained that the braking torque increases with an increasing pressure of the viscous medium. With the help of the invention it is therefore also possible within limits to set the braking torque to a desired value or to increase its value.

BRIEF DESCRIPTION OF THE DRAWING

Various other objects, features, and attendant advantages of the present invention will be more fully appreciated from the following detailed description when considered in connection with the accompanying drawings, wherein:

The sole FIGURE is a section through a rotation damper constructed according to the invention.

DETAILED DESCRIPTION OF THE INVENTION

The rotation damper shown in the drawing comprises a housing 10 which on the inside forms a cylindrical passage 12. In the passage 12 a rotor 14 is rotatably arranged which accomodates annular seals 18 in two circumferential grooves 16 spaced apart in the axial direction, these annular seals 18 sealingly cooperating with the inner wall of the housing 10 which defines the passage 12. The sleeve-shaped rotor 14 is seated on a shaft or axle 20 which for example at the same time defines the rotational axis of a component to be dampened which for its part is in working connection with the housing 10. Between the wall of the housing 10 defining the passage 12 and the outer side of the rotor 14 there is formed an annular gap 22 into which a viscous medium is filled, which on rotation of the rotor 14 with respect to the housing 10 produces a braking torque. As far as this structure described so far, this corresponds to the state of the art.

In the housing 10 a filler opening 24 is radially formed which connects the annular gap 22 to a region outside the housing 10. The filler opening 24 extends through the thickness of the housing 10 and is extended on the outer side of the housing 10 by a projection 26. The opening 24 has a circular cross section which remains approximately the same over the length of the opening 24.

In the opening 24 there is located a ball 28 whose diameter is slightly larger than the diameter of the opening 24.

The filling of the viscous medium is effected after the rotation damper described has been completely assembled. Subsequently with the help of a filling device which is not shown, the viscous medium is poured into the housing 10 by means of the opening 24, such being in a metered quantity. The filling quantity is such that it extendes far into the opening 24, but only so far so that the ball 28 can be completely pressed into the opening 24. This procedure is effected after filling, wherein depending on the application of pressure on the ball 28, a larger or smaller pressure is exerted on the viscous medium. This pressure affects or rather noticeably increases the braking torque which can be applied by the rotation damper.

If the ball is kept in its position for a sufficient length of time, it burrows itself into a circular furrow in the wall of the opening 24 and by means of this interrelated structure is adequately held. Further arrangements to seal the filler opening 24 are not necessary. Obviously, many modifications and variations of the present invention are possible in light of the above teachings. It is therefore understood that within the scope of the appended claims, the present invention may be practiced otherwise than as specifically described herein.

What is claimed is:

1. A rotation damper for damping the rotational movement of a rotary member, comprising:
   a housing having a longitudinal axis and comprising an axially extending annular wall disposed around said longitudinal axis wherein said axially extending annular wall comprises an axially extending inner peripheral wall surface;
   a rotor rotatably disposed within and with respect to said housing about said axis and having an axially extending outer peripheral wall surface which is spaced from said axially extending inner peripheral wall surface of said housing so as to define therewith an axially extending annular gap;
   a viscous medium disposed within said axially extending annular gap for damping rotational movements of said rotor with respect to said housing;
   a shaft connected to said rotor and having at least one end projecting out from said housing for connection to a rotary member;
   a filler opening formed within a substantially axially central portion of said axially extending annular wall of said housing for permitting said viscous medium to be deposited within said axially extending annular gap formed between said axially extending outer peripheral wall surface of said rotor and said axially extending inner peripheral wall of said housing;
   seal means disposed at axial positions located upon opposite sides of said filler opening and operatively engaged with both said axially extending outer peripheral wall surface of said rotor and said axially extending inner peripheral wall surface of said housing for retaining said viscous medium within said axially extending annular gap defined between said axially extending outer peripheral wall surface of said rotor and said axially extending inner peripheral wall surface of said housing; and
   closure means disposed within said filler opening for closing said filler opening and preventing leakage of said viscous medium out from said axially extending annular gap defined between said axially extending outer peripheral wall surface of said rotor and said axially extending inner peripheral wall surface of said housing.

2. A rotation damper according to claim 1, wherein:
   said closure means comprises a ball element.

3. The damper as set forth in claim 2, wherein:
   said ball element has a diametrical extent which is larger than the inner diametrical extent of said filler opening.

4. A rotation damper according to claim 1, wherein:
   said shaft has opposite ends thereof which project out from said housing.

5. The damper as set forth in claim 1, wherein:
   said filler opening has a substantially uniform circular cross-section over substantially the entire length thereof.

6. The damper as set forth in claim 1, wherein:
   said seal means comprises a pair of O-rings axially spaced from each other.

7. The damper as set forth in claim 1, wherein:
   said filler opening extends radially through said axially extending wall portion of said housing.

8. A rotation damper for damping the rotational movement of a rotary member, comprising:
   a housing having a longitudinal axis and comprising an axially extending annular wall disposed around said longitudinal axis wherein said axially extending annular wall comprises an axially extending inner peripheral wall surface;
   a rotor rotatably disposed within and with respect to said housing about said axis and having an axially extending outer peripheral wall surface which is spaced from said axially extending inner peripheral wall surface of said housing so as to define therewith an axially extending annular gap;
   a viscous medium disposed within said axially extending annular gap for damping rotational movements of said rotor with respect to said housing;
   a shaft connected to said rotor and having at least one end projecting out from said housing for connection to a rotary member;
   a filler opening formed within a substantially axially central portion of said axially extending annular wall of said housing for permitting said viscous medium to be deposited within said axially extending annular gap formed between said axially extending outer peripheral wall surface of said rotor and said axially extending inner peripheral wall of said housing;

seal means disposed at axial positions located upon opposite sides of said filler opening and operatively engaged with both said axially extending outer peripheral wall surface of said rotor and said axially extending inner peripheral wall surface of said housing for retaining said viscous medium within said axially extending annular gap defined between said axially extending outer peripheral wall surface of said rotor and said axially extending inner peripheral wall surface of said housing; and closure means mounted upon said axially extending annular wall of said housing and operatively associated with said filler opening for closing said filler opening and preventing leakage of said viscous medium out from said axially extending annular gap defined between said axially extending outer peripheral wall surface of said rotor and said axially extending inner peripheral wall surface of said housing.

9. The rotation damper as set forth in claim 8, wherein:
said filler opening has a substantially uniform circular cross-section over substantially the entire length thereof.

10. The rotation damper as set forth in claim 8, wherein:
said seal means comprises a pair of axially spaced O-rings.

11. The rotation damper as set forth in claim 8, wherein:
said closure means comprises a ball element.

12. The rotation damper as set forth in claim 11, wherein:
said filler opening has a predetermined diametrical extent; and said ball element has a diametrical extent which is larger than said inner diametrical extent of said filler opening.

13. The rotation damper as set forth in claim 8, wherein:
said filler opening extends radially through said axially extending annular wall of said housing.

14. The rotation damper as set forth in claim 8, wherein:
said shaft has opposite axial ends thereof which project outwardly from opposite axial ends of said housing.

\* \* \* \* \*